US010935794B1

(12) United States Patent
Amirsolaimani et al.

(10) Patent No.: US 10,935,794 B1
(45) Date of Patent: Mar. 2, 2021

(54) LOW-OBLIQUITY BEAM SCANNER WITH POLARIZATION-SELECTIVE GRATING

(71) Applicant: Facebook Technologies, LLC, Menlo Park, CA (US)

(72) Inventors: Babak Amirsolaimani, Redmond, WA (US); Brian Wheelwright, Sammamish, WA (US); Ying Geng, Bellevue, WA (US); Weichuan Gao, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/568,897

(22) Filed: Sep. 12, 2019

(51) Int. Cl.
*G09G 5/00* (2006.01)
*G02B 27/01* (2006.01)
*G02B 5/18* (2006.01)
*G02B 5/32* (2006.01)

(52) U.S. Cl.
CPC ....... *G02B 27/0172* (2013.01); *G02B 5/1814* (2013.01); *G02B 5/32* (2013.01); *G02B 2027/014* (2013.01); *G02B 2027/0174* (2013.01)

(58) Field of Classification Search
CPC .......... G02B 27/017; G02B 27/0172; G02B 5/1814; G02B 5/32; G02B 2027/014; G02B 2027/0178

USPC ............................................ 345/7, 8
See application file for complete search history.

(56) References Cited

U.S. PATENT DOCUMENTS

2018/0120559 A1* 5/2018 Yeoh .................. G02B 5/3083

OTHER PUBLICATIONS

"Optical properties of reflective liquid crystal polarization volume gratings" Lee et al. Journal of the Optical Society of America vol. 36, No. 5, May 2019.

* cited by examiner

*Primary Examiner* — Jennifer T Nguyen
(74) *Attorney, Agent, or Firm* — Pequignot + Myers; Matthew A. Pequignot (57) ABSTRACT

A beam scanner of a projector-based near-eye display includes a polarization volume hologram (PVH) grating. The PVH grating receives a polarized light beam from a light source and couples the beam to a tiltable reflector, e.g. a 2D tiltable MEMS reflector, for angular scanning the beam. The light beam impinging onto the tiltable reflector is separated from the light beam reflected from the tiltable reflector by polarization, due to the PVH grating diffracting light of only one handedness of polarization. Upon reflection from the tiltable reflector, the beam changes the handedness of polarization, which enables its separation from the impinging beam. The beam scanner may receive multiple light beams from multiple light sources. A projector and a near-eye display based on such beam scanners are also disclosed.

20 Claims, 8 Drawing Sheets

LOW-OBLIQUITY BEAM SCANNER WITH POLARIZATION-SELECTIVE GRATING

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD/NED is usually worn on the head of a user, a large, bulky, unbalanced, and/or heavy display device would be cumbersome and may be uncomfortable for the user to wear.

Projector-based displays provide images in angular domain, which can be observed by a user directly, without an intermediate screen or a large display panel. A waveguide may be used to carry the image in angular domain to the user's eye. The lack of a screen or high numerical aperture collimating optics in a scanning projector display enables size and weight reduction of the display. A scanner for a projector display needs to be compact, fast, have a wide scanning range, and preserve the optical quality of the beam being scanned to form an image in angular domain.

SUMMARY

In accordance with the present disclosure, there is provided a beam scanner comprising a first redirecting diffraction grating configured to diffract an impinging first light beam to obtain a second light beam having a first handedness of polarization. A polarization volume hologram (PVH) grating is disposed and configured to receive and diffract the second light beam by reflective diffraction to obtain a third light beam. A chromatic dispersion of the first redirecting diffraction grating is opposite to a chromatic dispersion of the PVH grating. A tiltable reflector is disposed and configured to receive and reflect the third light beam at a variable angle back towards the PVH grating. The third light beam reflected by the tiltable reflector has a second handedness of polarization opposite to the first handedness, whereby the third light beam propagates through the PVH grating.

In some embodiments, the PVH grating comprises a liquid crystal layer comprising liquid crystal molecules in a periodic helical configuration. The liquid crystal molecules may have spatially varying azimuthal angle at a surface of the liquid crystal layer. The periodic helical configuration may be polymer-stabilized. The liquid crystal molecules may be nematic liquid crystal molecules in a cholesteric configuration including a plurality of helical periods between top and bottom surfaces of the liquid crystal layer.

In some embodiments, the beam scanner further includes a collimator upstream of the first redirecting diffraction grating. The collimator is configured to collimate the first light beam impinging onto the first redirecting diffraction grating. The beam scanner may further include a second redirecting diffraction grating configured to diffract an impinging fourth light beam to obtain a fifth light beam having the first handedness of polarization. The PVH grating may be disposed and configured to receive and diffract the fifth light beam by reflective diffraction to obtain a sixth light beam, where a chromatic dispersion of the second redirecting diffraction grating is opposite to the chromatic dispersion of the PVH grating. The tiltable reflector may be configured to receive and reflect the sixth light beam at a variable angle back towards the PVH grating. The sixth light beam reflected by the tiltable reflector has the second handedness of polarization opposite to the first handedness, whereby the sixth light beam propagates through the PVH grating. The first and second redirecting diffraction gratings may be disposed side-by-side. The tiltable reflector may include a 2D microelectromechanical system (MEMS) tiltable reflector, for example.

In accordance with the present disclosure, there is provided a projector comprising a first light source for providing a first light beam. A first redirecting diffraction grating is disposed and configured to receive and diffract the first light beam to obtain a second light beam having a first handedness of polarization. A PVH grating is disposed and configured to receive and diffract the second light beam by reflective diffraction to obtain a third light beam. A chromatic dispersion of the first redirecting diffraction grating is opposite to a chromatic dispersion of the PVH grating. A tiltable reflector is disposed and configured to receive and reflect the third light beam at a variable angle back towards the PVH grating. The third light beam reflected by the tiltable reflector has a second handedness of polarization opposite to the first handedness, whereby the third light beam propagates through the PVH grating.

In some embodiments, the PVH grating comprises a liquid crystal layer comprising liquid crystal molecules in a periodic helical configuration. The liquid crystal molecules may have spatially varying azimuthal angle at a surface of the liquid crystal layer.

In some embodiments, the projector further includes a collimator in an optical path between the first light source and the first redirecting diffraction grating. The collimator is configured to collimate the first light beam impinging onto the first redirecting diffraction grating. The first light source may include a plurality of individually controllable emitters optically coupled to the collimator for providing a plurality of collimated sub-beams. The first light beam impinging onto the first redirecting diffraction grating comprises the plurality of collimated sub-beams. The plurality of individually controllable emitters may include an emitter of a red color channel, an emitter of a green color channel, and an emitter of a blue color channel of an image to be displayed by the projector.

In some embodiments, the projector further includes a second light source for providing a fourth light beam and a second redirecting diffraction grating configured to diffract an impinging fourth light beam to obtain a fifth light beam having the first handedness of polarization. The PVH grating may be disposed and configured to receive and diffract the fifth light beam by reflective diffraction to obtain a sixth light beam, wherein a chromatic dispersion of the second redirecting diffraction grating is opposite to the chromatic dispersion of the PVH grating. The tiltable reflector may be configured to receive and reflect the sixth light beam at a variable angle back towards the PVH grating. The sixth light beam reflected by the tiltable reflector has the second handedness of polarization opposite to the first handedness, whereby the sixth light beam propagates through the PVH grating.

In accordance with the present disclosure, there is further provided a near-eye display comprising a first light source for providing a first light beam, a first redirecting diffraction grating disposed and configured to receive and diffract the first light beam to obtain a second light beam having a first handedness of polarization, and a PVH grating disposed and configured to receive and diffract the second light beam by reflective diffraction to obtain a third light beam. A chromatic dispersion of the first redirecting diffraction grating is opposite to a chromatic dispersion of the PVH grating. The near-eye display further includes a tiltable reflector disposed and configured to receive and reflect the third light beam at a variable angle back towards the PVH grating. The third light beam reflected by the tiltable reflector has a second handedness of polarization opposite to the first handedness, whereby the third light beam propagates through the PVH grating. A controller isoperably coupled to the first light source and the tiltable reflector. The controller is configured to operate the tiltable reflector to cause the third light beam reflected from the tiltable reflector and propagated through the PVH grating to have a beam angle corresponding to a first pixel of an image to be displayed. The controller is further configured to operate the first light source in coordination with operating the tiltable reflector, such that the third light beam has brightness corresponding to the first pixel. In some embodiments, the near-eye display further includes a pupil-replicating waveguide disposed proximate the PVH grating and configured to receive and propagate therein the third light beam propagated through the PVH grating.

In some embodiments, the near-eye display further includes a collimator in an optical path between the first light source and the first redirecting diffraction grating. The collimator is configured to collimate the first light beam impinging onto the first redirecting diffraction grating. The first light source may include a plurality of emitters optically coupled to the collimator for providing a plurality of collimated sub-beams each corresponding to a color channel of the image to be displayed. The first light beam impinging onto the first redirecting diffraction grating comprises the plurality of collimated sub-beams. The controller is operably coupled to the plurality of emitters and is configured to operate the plurality of emitters in coordination with operating the tiltable reflector, such that the third light beam has luminance and/or color corresponding to the first pixel.

The near-eye display may further include a second light source for providing a fourth light beam, and a second redirecting diffraction grating configured to diffract an impinging fourth light beam to obtain a fifth light beam having the first handedness of polarization. The PVH grating may be disposed and configured to receive and diffract the fifth light beam by reflective diffraction to obtain a sixth light beam, wherein a chromatic dispersion of the second redirecting diffraction grating is opposite to the chromatic dispersion of the PVH grating. The tiltable reflector may be configured to receive and reflect the sixth light beam at a variable angle back towards the PVH grating. The sixth light beam reflected by the tiltable reflector has the second handedness of polarization opposite to the first handedness, whereby the sixth light beam propagates through the PVH grating. The controller may be operably coupled to the second light source and configured to operate the tiltable reflector to cause the sixth light beam reflected from the tiltable reflector and propagated through the PVH grating to have a beam angle corresponding to a second pixel of the image to be displayed. The controller may be further configured to operate the second light source in coordination with operating the tiltable reflector, such that the sixth light beam has brightness and/or color corresponding to the second pixel.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A tiltable reflector may be used to scan a light beam emitted by a light source to form an image in angular domain for direct observation by a user. As the light beam is scanned, the brightness and/or color of the scanned light beam may be varied in coordination with the scanning, in accordance with pixels of the displayed image being pointed at by the scanner. The entire image is formed by a display when the light beam is scanned in two dimensions, e.g. over X- and Y-viewing angles, over the entire frame or field of view (FOV) of the display. When the frame rate is high enough, the eye integrates the scanned light beam, enabling the user to see the displayed imagery substantially without flicker.

One problem associated with near-eye display image scanners is reduction of field of view (FOV) caused by an oblique angle of incidence of the light beam onto a tiltable reflector of the scanner. The oblique angle may be required by the optical geometry used, e.g. to physically separate an impinging light beam from the scanned, i.e. reflected, light beam. The FOV reduction is caused by distortion of the solid angle representing the range of scanning at oblique angles of incidence of light beam at the tiltable reflector.

In accordance with the present disclosure, the output (scanned) light beam may be spatially separated from the input optical beam by polarization. This obviates the need in geometrical separation of the beams by oblique angles of incidence, resulting in a compact configuration providing a nearly straight angle of incidence at the tiltable reflector when the latter is in a center (non-tilted) angular position. Low obliquity of the impinging light beam enables the scanning range to be utilized more efficiently.

Figure 1A:
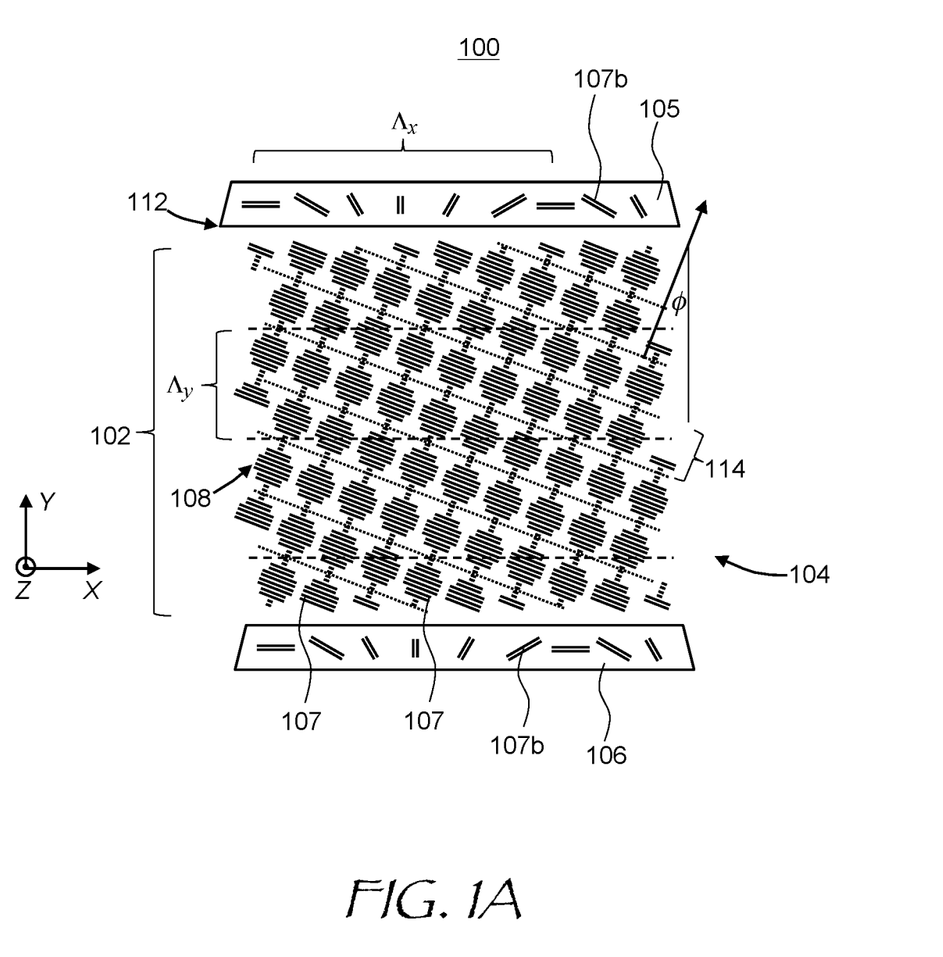
FIG. 1A is a schematic cross-sectional view of a polarization volume hologram (PVH) grating of this disclosure.

Grating structures based on so-called polarization volume holograms may be used to separate the input and output light beams by polarization. By way of example, referring to FIG. 1A, a polarization volume hologram (PVH) grating 100 includes an LC layer 104 bound by opposed top 105 and bottom 106 parallel surfaces. The LC layer 104 may include an LC fluid containing rod-like LC molecules 107 with positive dielectric anisotropy, e.g. nematic LC molecules. A chiral dopant may be added to the LC fluid, causing the LC molecules in the LC fluid to self-organize into a periodic helical configuration including helical structures 108 extending between the top 105 and bottom 106 parallel surfaces of the LC layer 104. Such a configuration of the LC molecules 107, termed herein a cholesteric configuration, includes a plurality of helical periods p, e.g. at least two, at least five, at least ten, at least twenty, or at least fifty helical periods p between the top 105 and bottom 106 parallel surfaces of the LC layer 104. Boundary LC molecules 107b at the top surface 105 of the LC layer 104 may be oriented at an angle to the top surface 105. The boundary LC molecules 107b may have a spatially varying azimuthal angle, e.g. linearly varying along X-axis parallel to the top surface 105, as shown in FIG. 1A. To that end, an alignment layer 112 may be provided at the top surface 105 of the LC layer 104. The alignment layer 112 may be configured to provide the desired orientation pattern of the boundary LC molecules 107b, such as the linear dependence of the azimuthal angle on the X-coordinate. A pattern of spatially varying polarization directions of the UV light may be selected to match a desired orientation pattern of the boundary LC molecules 107a at the top surface 105 and/or the bottom surface 106 of the LC layer 104. When the alignment layer 112 is coated with the cholesteric LC fluid, the boundary LC molecules 107a are oriented along the photopolymerized chains of the alignment layer 112, thus adopting the desired surface orientation pattern. Adjacent LC molecules adopt helical patterns extending from the top 105 to the bottom 106 surfaces of the LC layer 104, as shown.

The boundary LC molecules 107b define relative phases of the helical structures 108 having the helical period p. The helical structures 108 form a volume grating comprising helical fringes 114 tilted at an angle $\phi$, as shown in FIG. 1A. The steepness of the tilt angle $\phi$ depends on the rate of variation of the azimuthal angle of the boundary LC molecules 107b at the top surface 105 and p. Thus, the tilt angle $\phi$ is determined by the surface alignment pattern of the boundary LC molecules 107A at the alignment layer 112. The volume grating has a period $\Lambda_x$ along X-axis and $\Lambda_y$ along Y-axis. In some embodiments, the periodic helical structures 108 of the LC molecules 107 may be polymer-stabilized by mixing in a stabilizing polymer into the LC fluid, and curing (polymerizing) the stabilizing polymer.

Figure 1B:
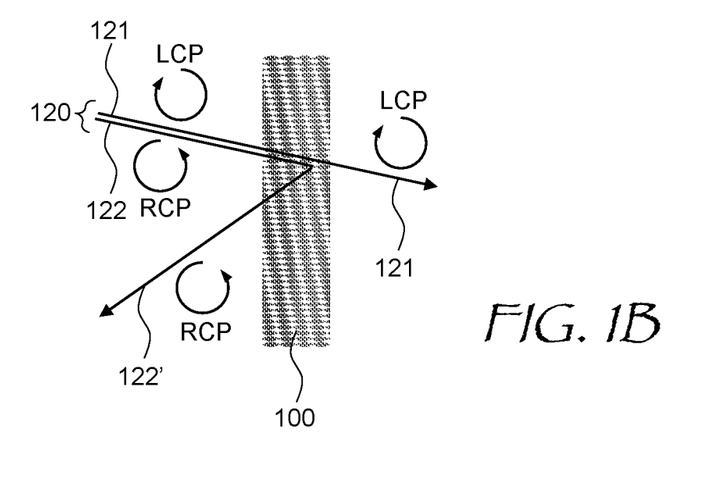
FIG. 1B is a schematic diagram illustrating the principle of operation of the PVH grating of FIG. 1A.

The helical nature of the fringes 114 of the volume grating makes the PVH grating 100 preferably responsive to light of polarization having one particular handedness, e.g. left- or right-circular polarization, while being substantially non-responsive to light of the opposite handedness of polarization. Thus, the helical fringes 114 make the PVH grating 100 polarization-selective. This is illustrated in FIG. 1B, which shows a light beam 120 impinging onto the PVH grating 100. The light beam 120 includes a left circular polarized (LCP) beam component 121 and a right circular polarized (RCP) beam component 122. The LCP beam component 121 propagates through the PVH grating 100 substantially without diffraction. Herein, the term "substantially without diffraction" means that, even though an insignificant portion of the beam (the LCP beam component 121 in this case) might diffract, the portion of the diffracted light energy is so small that it does not impact the intended performance of the PVH grating 100. The RCP beam component 122 of the light beam 120 undergoes diffraction, producing a diffracted beam 122'. The polarization selectivity of the PVH grating 100 results from the effective refractive index of the grating being dependent on the relationship between the handedness, or chirality, of the impinging light beam and the handedness, or chirality, of the grating fringes 114. It is further noted that the sensitivity of the PVH 100 to right circular polarized light in particular is only meant as an illustrative example. When handedness of the helical fringes 114 is reversed, the PVH 100 may be made sensitive to left circular polarized light.

Figure 2:
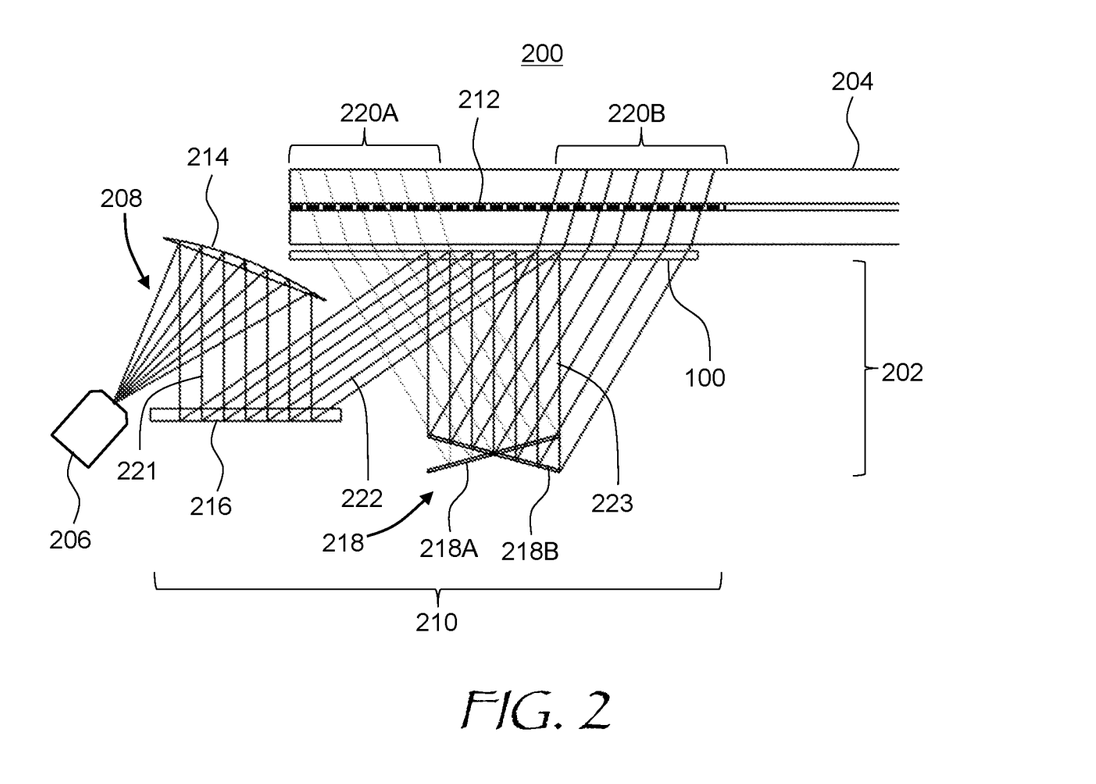
FIG. 2 is a side cross-sectional view of a near-eye display (NED) of this disclosure including a low-obliquity beam scanner equipped with the PVH grating of FIGS. 1A and 1B.

Referring to FIG. 2, a near-eye display (NED) 200 includes a projector 202 optically coupled to a pupil-replicating waveguide 204. The projector 202 includes a light source 206 for providing image light 208 of controllable brightness and/or color(s), and a beam scanner 210 for receiving scanning the image light 208 across an input grating 212 of the pupil-replicating waveguide 204. An optional collimator 214 may be disposed in an optical path between the light source 208 and the beam scanner 210, for collimating the image light 208 to obtain a first light beam 221. The light source may provide polarized light of a pre-defined handedness, e.g. LCP or RCP light. A polarizer, e.g. a circular polarizer, may be provided for this purpose.

The beam scanner 210 includes a first redirecting diffraction grating 216 configured to diffract the impinging first light beam 221 to obtain a second light beam 222, which is right circular polarized. The first redirecting diffraction grating 216 may, but does not have to be, a PVH grating. The PVH grating 100 is disposed in a path of the second light beam 222 and configured to receive and diffract the second light beam 222 by reflective diffraction to obtain a third light beam 223. A chromatic dispersion of the first redirecting diffraction 216 grating is selected to be opposite to a chromatic dispersion of the PVH grating 100, e.g. the chromatic dispersion may have the same amplitude but opposite sign. Thus, the chromatic dispersions of the first redirecting diffraction 216 and the PVH grating 100 at least partially offset each other or even completely cancel each other, and therefore, when the image light 208 includes light at multiple wavelengths, the reflected third light beam 223 will not be wavelength dispersed, i.e. the beam angle of the reflected third light beam 223 will not be dependent on wavelength.

A tiltable reflector 218, e.g. a 2D microelectromechanical system (MEMS) tiltable reflector, is disposed in an optical path of the third light beam 223, e.g. under the PVH grating 100, and configured to receive and reflect the third light beam 223 at a variable angle back towards the PVH grating 100. The third light beam 223 reflected by the tiltable reflector 218 changes the handedness of polarization upon reflection. This happens because the direction of propagation of the reflected third light beam 223 changes, while the phase relationship between x- and y-component of the light field of the third light beam 223 impinging onto the tiltable reflector 218 remains substantially the same. Since the handedness of the circular polarization is determined with the account of direction of propagation, the handedness of the reflected third light beam 223 changes as well. The third light beam 223 changes handedness of its polarization to an opposite handedness and, as a result, propagates through the PVH grating 100 substantially without diffraction. The third light beam 223 impinges onto the input grating 212 of the pupil-replicating waveguide 204 disposed over the PVH 100 at a location and angle depending on angle of tilt of the tiltable reflector 218. For example, when the tiltable reflector 218 is in a left position 218A, the third light beam 223 impinges into the input grating 212 at a first location and angle 220A; and when the tiltable reflector 218 is in a right position 218B, the third light beam 223 impinges into the input grating 212 at a second location and angle 220B. During scanning, the tiltable reflector 218 may oscillate between the left position 218A and the right position 218B. Although the tilting is shown only about one axis in FIG. 2, the tiltable reflector 218 may tilt/scan about two axes, i.e. about X and Y axes.

By coordinating the instantaneous brightness and/or color of the image light 208 generated by the light source 206 with an instantaneous angle of scanning provided by the beam scanner 210, an image in angular domain may be formed. The scanned third light beam 223 is in-coupled by the input grating 212 to propagate within the pupil-replicating waveguide 204. The pupil-replicating waveguide 204 out-couples multiple laterally offset copies of the third light beam 223 while preserving the beam angle, thus replicating the image in the angular domain over an output area of the pupil-replicating waveguide 204 for direct observation by a user's eye, not shown.

Figure 3A:
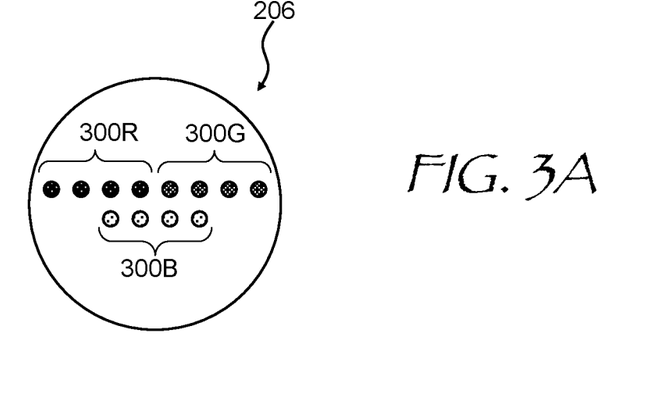
FIGS. 3A, 3B, and 3C are frontal views of multi-emitter light sources usable with the NED of FIG. 2.
Figure 3B:
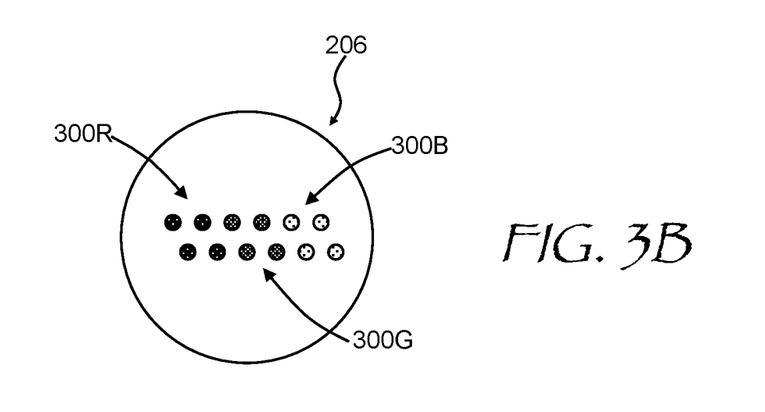
Figure 3C:
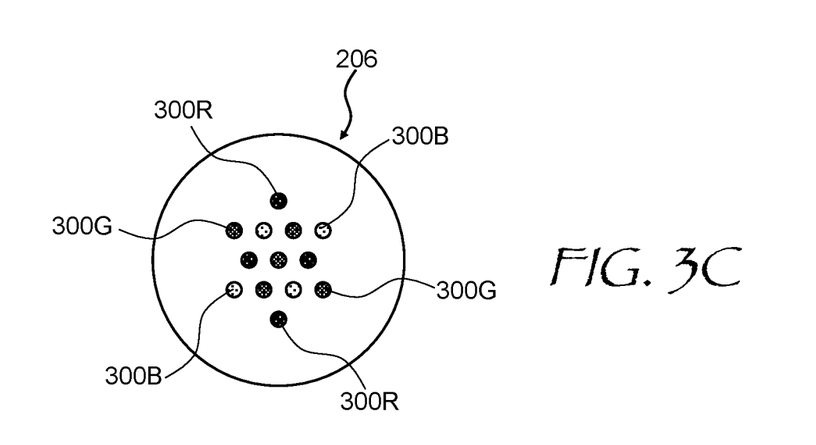

Referring to FIGS. 3A, 3B, and 3C, the light source 206 may include a plurality of individually controllable emitters, such as superluminescent light-emitting diodes (SLEDs), for example. Several emitters may be provided for each color channel. In some embodiments, four red emitters 300R may be provided for red (R) color channel (dark-shaded circles); four green emitters 300G may be provided for green (G) color channel (medium-shaded circles); and four blue emitters 300B may be provided for blue (B) color channel (light-shaded circles). The emitters 300R, 300G, and 300B may each be ridge emitters sharing a common semiconductor substrate. The emitters 300R, 300G, and 300B may be disposed in a line pattern (FIG. 3A); in a zigzag pattern (FIG. 3B); or in a honeycomb pattern (FIG. 3C), to name just a few examples.

Having a plurality of emitters illuminating a same tiltable reflector enables one to scan light beams generated by these emitters together as a group. When the light source 206 includes a plurality of individual emitters, the first light beam 221 impinging onto the first redirecting diffraction grating 216 includes the plurality of sub-beams collimated together by the collimator 214 and co-propagating at a slight angle w.r.t each other. Maximum angular cone of the sub-beams may be less than 5 degrees, or less than 2 degrees, or less than 1 degree in some embodiments. Multiple emitters and, in some cases, multiple light sources may be used to provide redundancy in case some of light sources fail, increase image resolution, increase overall image brightness, etc. Multiple light sources may each be equipped with its own collimator.

Figure 4:
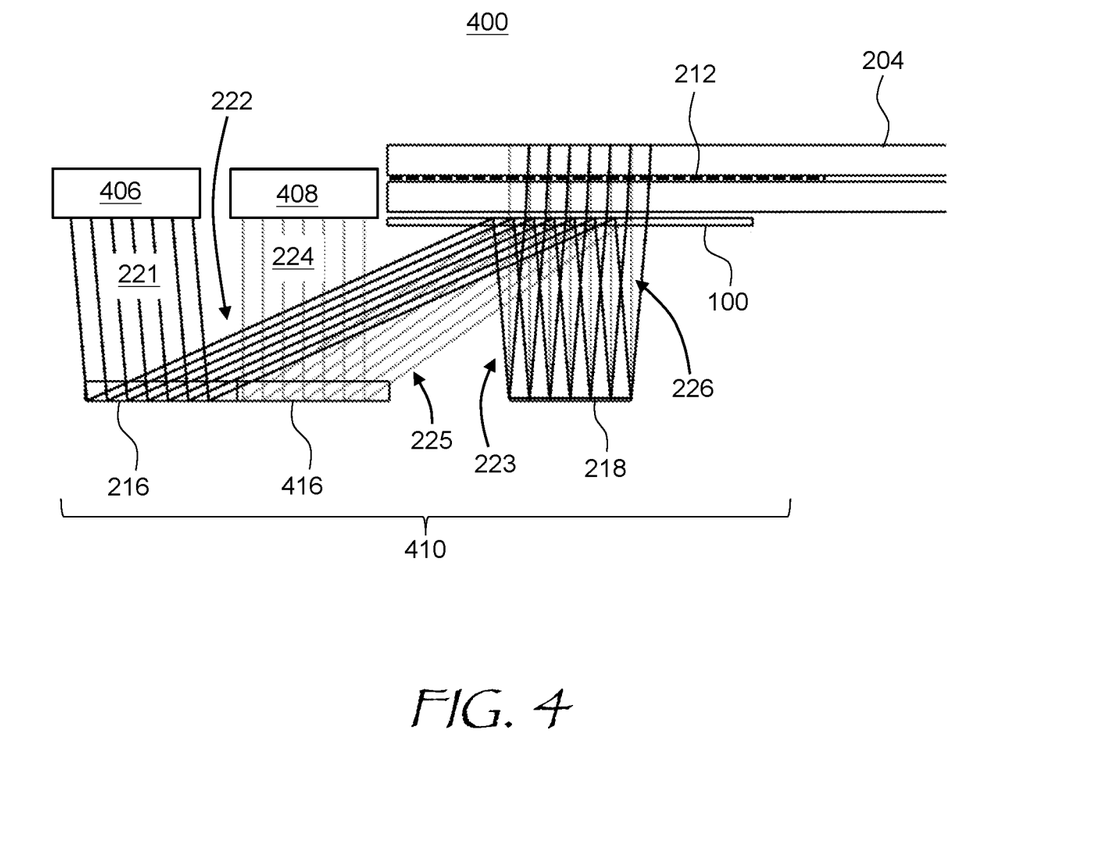
FIG. 4 is a side cross-sectional view of an NED of this disclosure including multiple light sources and a low-obliquity beam scanner coupling multiple light beams to a same tiltable reflector.

Referring to FIG. 4 with further reference to FIG. 2, an NED 400 of FIG. 4 is similar to the NED 200 of FIG. 2, and includes similar elements. The NED 400 includes first 406 and second 408 light sources, e.g. those depicted in FIGS. 3A, 3B, and 3C, producing the first light beam 221 and a fourth light beam 224, respectively. A beam scanner 410 of the NED 400 of FIG. 4 further includes a second redirecting diffraction grating 416 configured to diffract an impinging fourth light beam 224 provided by the second light source 408. The diffracted fourth light beam 224 forms a fifth light beam 225, which has the same handedness of polarization as the second light beam 222, i.e. RCP in this example.

The PVH grating 100 is disposed and configured to receive and diffract the fifth light beam 225 by reflective diffraction, to obtain a sixth light beam 226. The first 216 and second 416 redirecting diffraction gratings may be disposed side-by-side and parallel to the PVH grating 100, as shown. A small gap, e.g. 0.5 mm-3 mm gap, may be provided to avoid image light propagating in the pupil-replicating waveguide 204 from entering the PVH 100. This results in a compact configuration, and leaves room for the two light sources 406 and 408 to be disposed side-by-side. Similarly to the case of the first redirecting diffraction grating 216, the chromatic dispersion of the second redirecting diffraction grating 416 may be selected to be opposite to the chromatic dispersion of the PVH grating 100, such that the sixth light beam 226 is substantially not wavelength-dispersed, i.e. individual wavelengths sub-beams of the sixth light beam 226 all propagate substantially parallel to one another. The tiltable reflector 218 is configured to receive and reflect the sixth light beam 226 at a variable angle back towards the PVH grating 100. The sixth light beam 226 reflected by the tiltable reflector 218 has the second handedness of polarization opposite to the first handedness, whereby the sixth light beam 226 propagates through the PVH grating 100 and impinges onto the input grating 212 of the pupil-replicating waveguide 204. The angles of incidence of the third 223 and sixth 226 light beams may be selected to be different. Such a configuration enables different areas of a field of view (FOV) of the NED 400 to be powered by different light sources. This enables one to broaden the overall FOV of the NED 400 without expanding the scanning range of the tiltable reflector 218. The FOV portions corresponding to different light sources may overlap at a central area of the FOV, which may provide means for increasing spatial resolution of the NED 400 in the central FOV area. The PVH grating 100 may include a plurality of PVH sub-gratings optimized for individual color channels.

Figure 5A:
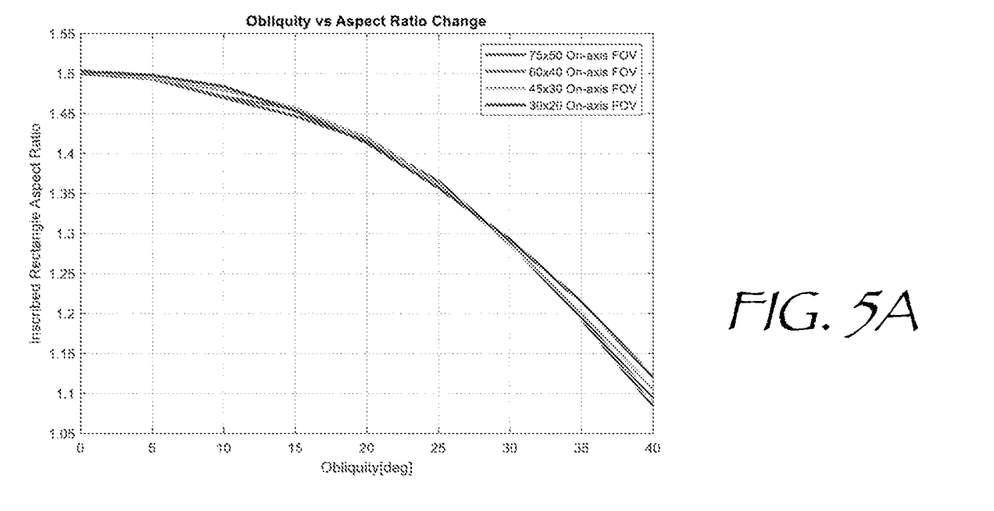
FIG. 5A is a graph of aspect ratio of a field of view (FOV) of a scanning projector display as a function of beam obliquity.
Figure 5B:
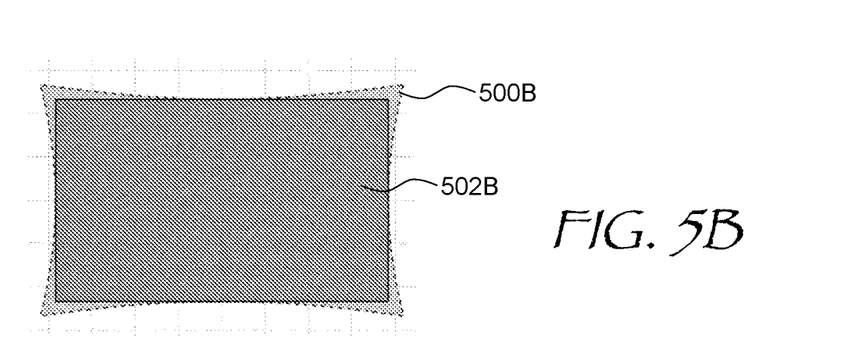
FIG. 5B is a schematic view of a FOV at zero obliquity in FIG. 5A.
Figure 5C:
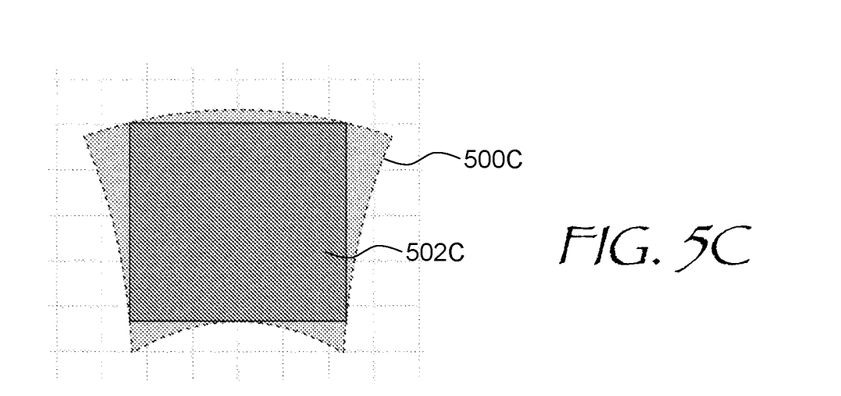
FIG. 5C is a schematic view of a FOV at maximum obliquity in FIG. 5A.

The NEDs 200 of FIG. 2 and 400 of FIG. 4 provide a low-obliquity coupling of light beam(s) to a tiltable reflector. Herein, the term "low obliquity" means a low angle of incidence, i.e. a normal incidence, at the tiltable reflector when in a nominal, e.g. a center or zero, angle of tilt. One advantage of having low obliquity is illustrated in FIGS. 5A to 5C. Referring first to FIG. 5A, an aspect ratio of a FOV of a projector using a tiltable reflector is plotted as a function of obliquity, i.e. angle of incidence at the tiltable reflector when in nominal or center position. The aspect ration is plotted for four cases: 75 degrees by 50 degrees on-axis FOV; 60 degrees by 40 degrees on-axis FOV; 45 degrees by 30 degrees on-axis FOV; and 30 degrees by 20 degrees on-axis FOV. The aspect ratio drops from 1.5 at zero obliquity, i.e. normal incidence, to about 1.1 at 40 degrees obliquity angle.

FIG. 5B shows a zero-obliquity scanning angular area 500B and an associated inscribed rectangular zero-obliquity FOV 502B. The zero-obliquity FOV 502B solid angle is covering most of the zero-obliquity scanning angular area 500B. By comparison, FIG. 5C shows a 40 degrees obliquity scanning angular area 500C and an associated inscribed rectangular oblique FOV 502C. The oblique FOV 502C solid angle occupies a smaller percentage of the 40 degrees obliquity scanning angular area 500C, and is almost 2 times less than the zero-obliquity FOV 502B. Thus, the low-obliquity coupling improves the utilization of the scanning range of a tiltable reflector, enabling wider fields of view at the same scanning range of the tiltable reflector.

Figure 6:
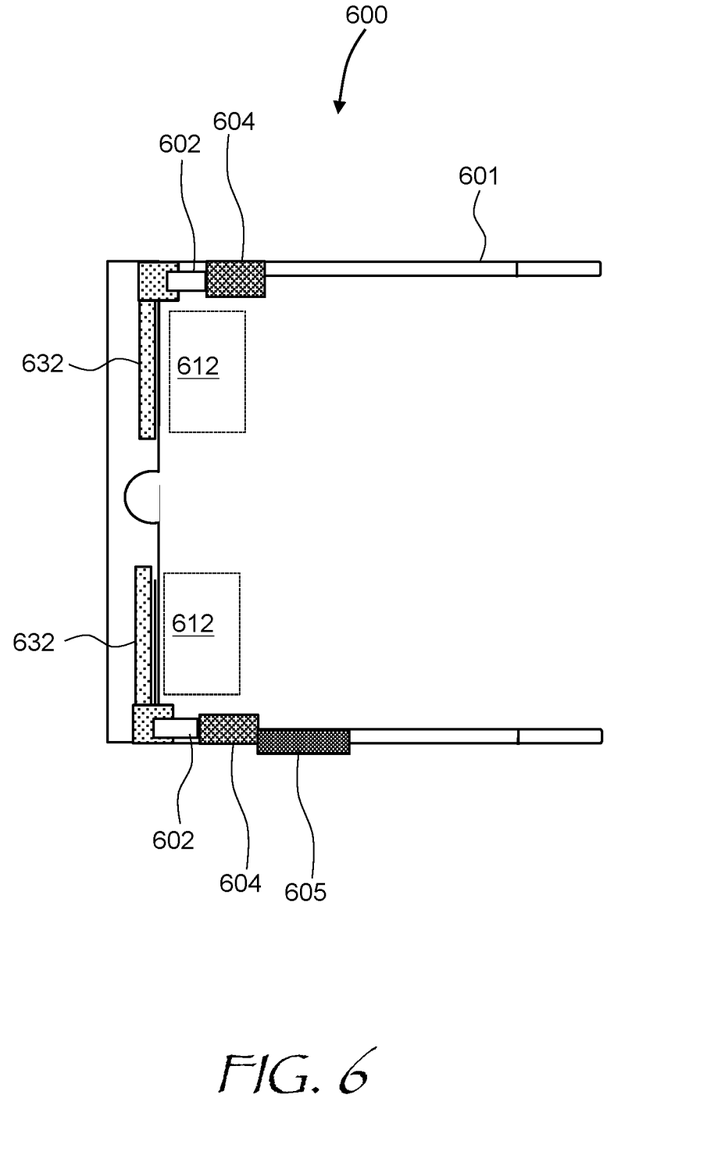
FIG. 6 is a plan cross-sectional view of an NED including beam scanners/projectors of this disclosure.

Referring to FIG. 6, a near-eye display (NED) 600 includes a frame 601 having a form factor of a pair of eyeglasses. The frame 601 may support, for each eye: a projector 602 for providing display light carrying an image in angular domain, an electronic driver 604 operably coupled to the projector 602 for powering the projector 602, and a pupil replicator 632 optically coupled to the projector 602.

Each projector 602 may include beam scanners and light sources described herein, for example and without limitation the beam scanner 210 of FIG. 2, or the beam scanner 410 of FIG. 4. Light sources for these projectors may include a substrate supporting an array of single-mode or multimode semiconductor light sources. For example, the light sources 206 (FIG. 2) and 406 and 408 (FIG. 4) may include side-emitting laser diodes, vertical-cavity surface-emitting laser diodes, SLEDs, or light-emitting diodes, for providing a plurality of light beams as described above with reference to FIGS. 3A, 3B, and 3C. Collimators for the light sources may include concave mirrors, bulk lenses, Fresnel lenses, holographic lenses, pancake lenses, etc. The pupil replicators 632 may include waveguides equipped with a plurality of surface relief and/or volume holographic gratings. The function of the pupil replicators 632 is to provide multiple laterally offset copies of the display light beams provided by the projectors 602 at respective eyeboxes 612.

A controller 605 is operably coupled to the light sources and tiltable reflectors of the projectors 602. The controller 605 may be configured to determine the X- and Y-tilt angles of the tiltable reflectors of the projectors 602. The controller 605 determines which pixel or pixels of the image to be displayed correspond to the determined X- and Y-tilt angles. Then, the controller 605 determines the brightness and/or color of these pixels, and operates the electronic drivers 604 accordingly for providing powering electric pulses to the light sources of the projectors 602 to produce light pulses at power level(s) corresponding to the determined pixel brightness and color.

In some embodiments, the controller 605 may be configured to operate, for each eye, the tiltable reflector 218 to cause the light beam reflected from the tiltable reflector 218 and propagated through the respective PVH grating 100 to have a beam angle corresponding to a pixel of an image to be displayed. The controller 605 may be further configured to operate the corresponding light source in coordination with operating the tiltable reflector 218, such that the light beam has brightness and/or color(s) corresponding to the pixel being displayed. In multi-light source embodiments, the controller 605 may be configured to operate the corresponding light sources in coordination, to provide a larger FOV, an improved scanning resolution, increased brightness of the display, etc., as described herein. For example, in embodiment where the projectors for both of user's eyes each include two light sources, the controller 605 may be configured to operate the tiltable reflector 218 to cause two light beams reflected from the tiltable reflector and propagated through the PVH grating to have beam angle corresponding to respective two pixels of an image to be displayed, and operate the light sources in coordination with operating the tiltable reflector 218, such that the two light beam have brightness and/or color corresponding to the two respective pixels. More light sources than two may be provided, each light source including one or a plurality of emitters, for one or a plurality of color channels of the image being displayed.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 7A:
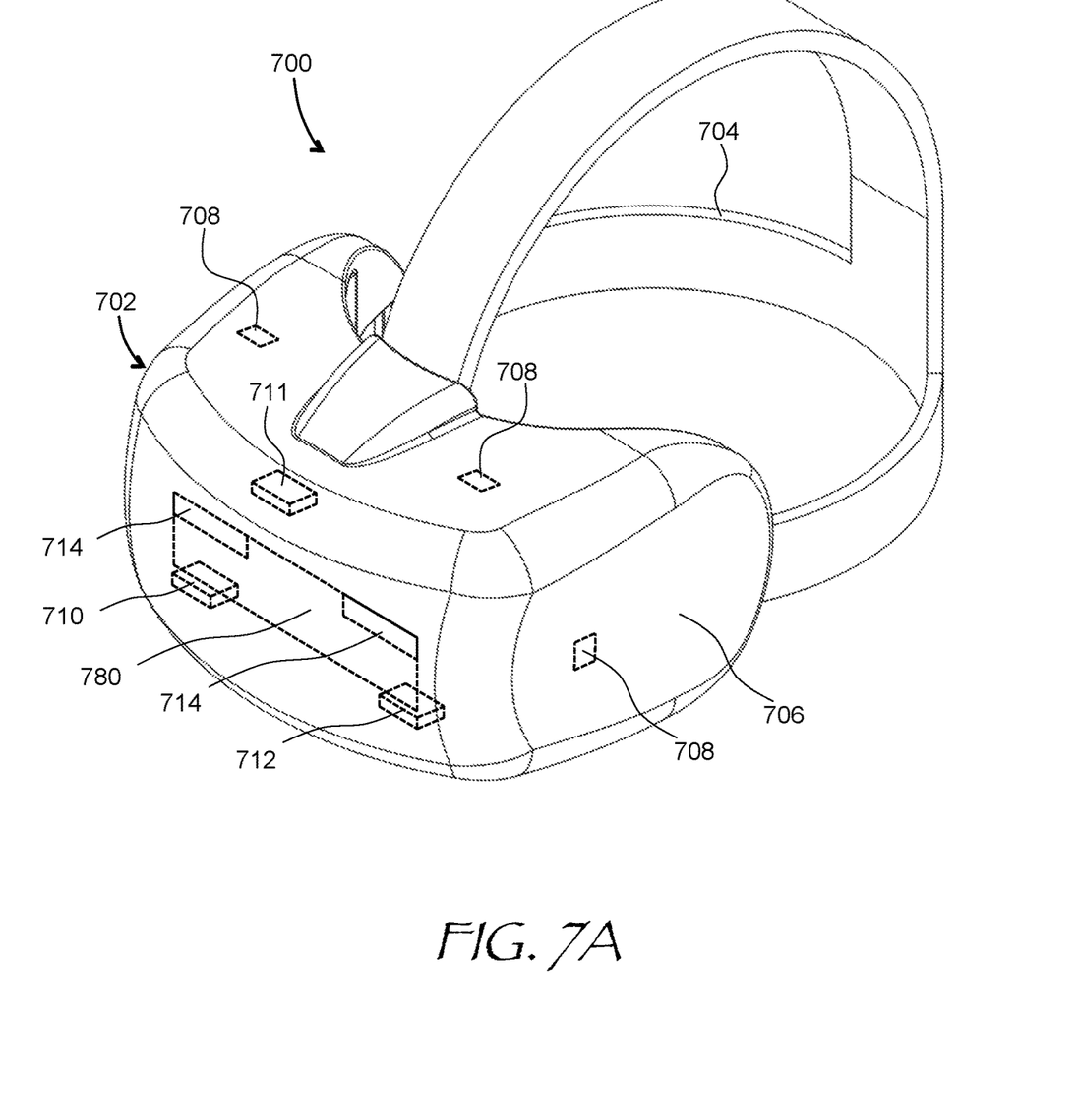
FIG. 7A is an isometric view of a head-mounted display (headset) of this disclosure.

Referring to FIG. 7A, an HMD 700 is an example of an AR/VR wearable display system which encloses the user's face, for a greater degree of immersion into the AR/VR environment. The HMD 700 is an embodiment of the NED 200 of FIG. 2 or the NED 400 of FIG. 4, for example. The function of the HMD 700 is to augment views of a physical, real-world environment with computer-generated imagery, and/or to generate the entirely virtual 3D imagery. The HMD 700 may include a front body 702 and a band 704. The front body 702 is configured for placement in front of eyes of a user in a reliable and comfortable manner, and the band 704 may be stretched to secure the front body 702 on the user's head. A display system 780 may be disposed in the front body 702 for presenting AR/VR imagery to the user. Sides 706 of the front body 702 may be opaque or transparent.

In some embodiments, the front body 702 includes locators 708 and an inertial measurement unit (IMU) 710 for tracking acceleration of the HMD 700, and position sensors 712 for tracking position of the HMD 700. The IMU 710 is an electronic device that generates data indicating a position of the HMD 700 based on measurement signals received from one or more of position sensors 712, which generate one or more measurement signals in response to motion of the HMD 700. Examples of position sensors 712 include: one or more accelerometers, one or more gyroscopes, one or more magnetometers, another suitable type of sensor that detects motion, a type of sensor used for error correction of the IMU 710, or some combination thereof. The position sensors 712 may be located external to the IMU 710, internal to the IMU 710, or some combination thereof.

The locators 708 are traced by an external imaging device of a virtual reality system, such that the virtual reality system can track the location and orientation of the entire HMD 700. Information generated by the IMU 710 and the position sensors 712 may be compared with the position and orientation obtained by tracking the locators 708, for improved tracking accuracy of position and orientation of the HMD 700. Accurate position and orientation is important for presenting appropriate virtual scenery to the user as the latter moves and turns in 3D space.

The HMD 700 may further include a depth camera assembly (DCA) 711, which captures data describing depth information of a local area surrounding some or all of the HMD 700. To that end, the DCA 711 may include a laser radar (LIDAR), or a similar device. The depth information may be compared with the information from the IMU 710, for better accuracy of determination of position and orientation of the HMD 700 in 3D space.

The HMD 700 may further include an eye tracking system 714 for determining orientation and position of user's eyes in real time. The obtained position and orientation of the eyes also allows the HMD 700 to determine the gaze direction of the user and to adjust the image generated by the display system 780 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 702.

Figure 7B:
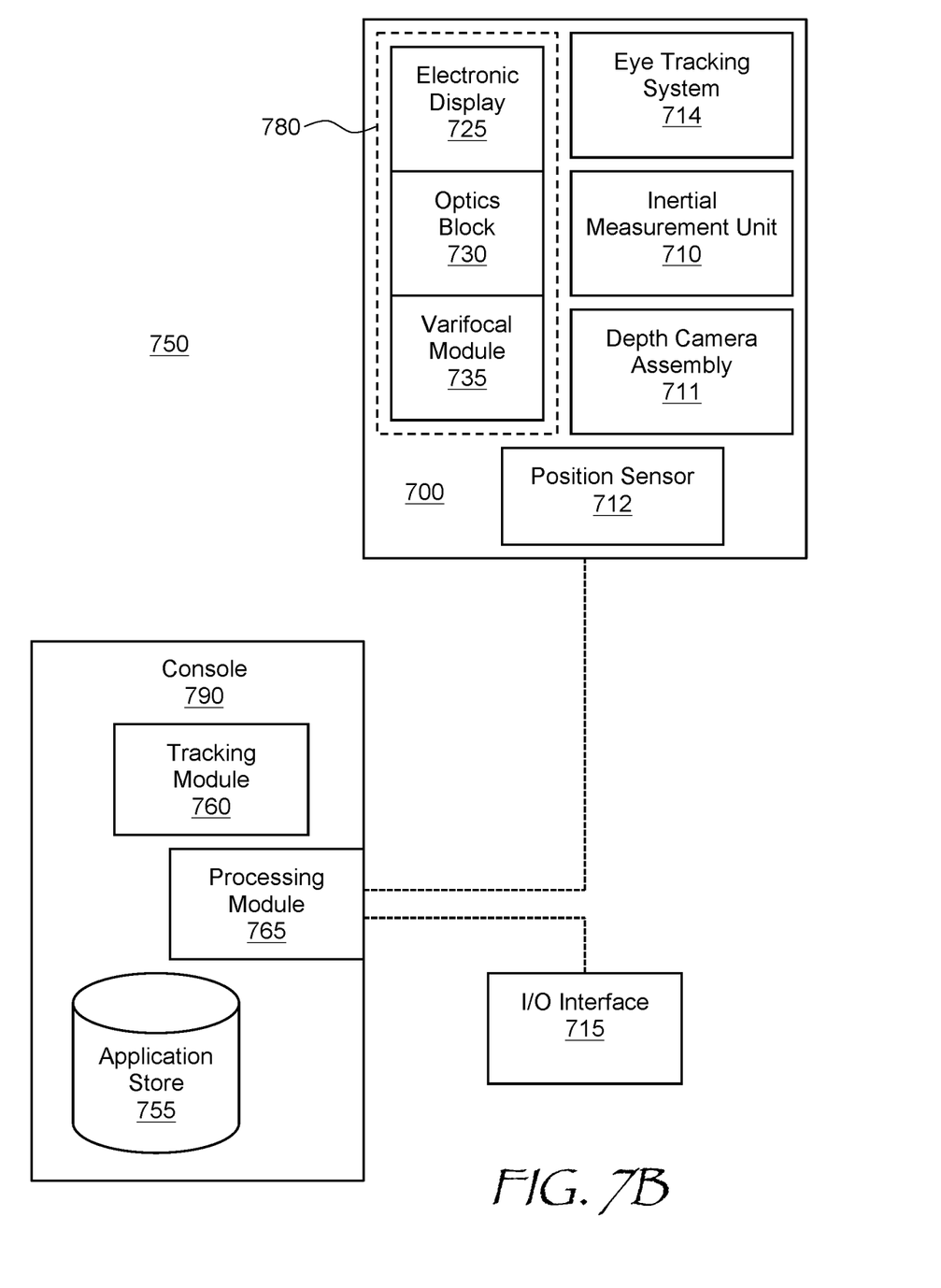
FIG. 7B is a block diagram of a virtual reality system including the headset of FIG. 7A.

Referring to FIG. 7B, an AR/VR system 750 includes the HMD 700 of FIG. 7A, an external console 790 storing various AR/VR applications, setup and calibration procedures, 3D videos, etc., and an input/output (I/O) interface 715 for operating the console 790 and/or interacting with the AR/VR environment. The HMD 700 may be "tethered" to the console 790 with a physical cable, or connected to the console 790 via a wireless communication link such as Bluetooth®, Wi-Fi, etc. There may be multiple HMDs 700, each having an associated I/O interface 715, with each HMD 700 and I/O interface(s) 715 communicating with the console 790. In alternative configurations, different and/or additional components may be included in the AR/VR system 750. Additionally, functionality described in conjunction with one or more of the components shown in FIGS. 7A and 7B may be distributed among the components in a different manner than described in conjunction with FIGS. 7A and 7B in some embodiments. For example, some or all of the functionality of the console 715 may be provided by the HMD 700, and vice versa. The HMD 700 may be provided with a processing module capable of achieving such functionality.

As described above with reference to FIG. 7A, the HMD 700 may include the eye tracking system 714 (FIG. 7B) for tracking eye position and orientation, determining gaze angle and convergence angle, etc., the IMU 710 for determining position and orientation of the HMD 700 in 3D space, the DCA 711 for capturing the outside environment, the position sensor 712 for independently determining the position of the HMD 700, and the display system 780 for displaying AR/VR content to the user. The display system 780 includes (FIG. 7B) an electronic display 725, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 780 further includes an optics block 730, whose function is to convey the images generated by the electronic display 725 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 780 may further include a varifocal module 735, which may be a part of the optics block 730. The function of the varifocal module 735 is to adjust the focus of the optics block 730 e.g. to compensate for vergence-accommodation conflict, to correct for vision defects of a particular user, to offset aberrations of the optics block 730, etc.

The I/O interface 715 is a device that allows a user to send action requests and receive responses from the console 790. An action request is a request to perform a particular action. For example, an action request may be an instruction to start or end capture of image or video data or an instruction to perform a particular action within an application. The I/O interface 715 may include one or more input devices, such as a keyboard, a mouse, a game controller, or any other suitable device for receiving action requests and communicating the action requests to the console 790. An action request received by the I/O interface 715 is communicated to the console 790, which performs an action corresponding to the action request. In some embodiments, the I/O interface 715 includes an IMU that captures calibration data indicating an estimated position of the I/O interface 715 relative to an initial position of the I/O interface 715. In some embodiments, the I/O interface 715 may provide haptic feedback to the user in accordance with instructions received from the console 790. For example, haptic feedback can be provided when an action request is received, or the console 790 communicates instructions to the I/O interface 715 causing the I/O interface 715 to generate haptic feedback when the console 790 performs an action.

The console 790 may provide content to the HMD 700 for processing in accordance with information received from one or more of: the IMU 710, the DCA 711, the eye tracking system 714, and the I/O interface 715. In the example shown in FIG. 7B, the console 790 includes an application store 755, a tracking module 760, and a processing module 765. Some embodiments of the console 790 may have different modules or components than those described in conjunction with FIG. 7B. Similarly, the functions further described below may be distributed among components of the console 790 in a different manner than described in conjunction with FIGS. 7A and 7B.

The application store 755 may store one or more applications for execution by the console 790. An application is a group of instructions that, when executed by a processor, generates content for presentation to the user. Content generated by an application may be in response to inputs received from the user via movement of the HMD 700 or the I/O interface 715. Examples of applications include: gaming applications, presentation and conferencing applications, video playback applications, or other suitable applications.

The tracking module 760 may calibrate the AR/VR system 750 using one or more calibration parameters and may adjust one or more calibration parameters to reduce error in determination of the position of the HMD 700 or the I/O interface 715. Calibration performed by the tracking module 760 also accounts for information received from the IMU 710 in the HMD 700 and/or an IMU included in the I/O interface 715, if any. Additionally, if tracking of the HMD 700 is lost, the tracking module 760 may re-calibrate some or all of the AR/VR system 750.

The tracking module 760 may track movements of the HMD 700 or of the I/O interface 715, the IMU 710, or some combination thereof. For example, the tracking module 760 may determine a position of a reference point of the HMD 700 in a mapping of a local area based on information from the HMD 700. The tracking module 760 may also determine positions of the reference point of the HMD 700 or a reference point of the I/O interface 715 using data indicating a position of the HMD 700 from the IMU 710 or using data indicating a position of the I/O interface 715 from an IMU included in the I/O interface 715, respectively. Furthermore, in some embodiments, the tracking module 760 may use portions of data indicating a position or the HMD 700 from the IMU 710 as well as representations of the local area from the DCA 711 to predict a future location of the HMD 700. The tracking module 760 provides the estimated or predicted future position of the HMD 700 or the I/O interface 715 to the processing module 765.

The processing module 765 may generate a 3D mapping of the area surrounding some or all of the HMD 700 ("local area") based on information received from the HMD 700. In some embodiments, the processing module 765 determines depth information for the 3D mapping of the local area based on information received from the DCA 711 that is relevant for techniques used in computing depth. In various embodiments, the processing module 765 may use the depth information to update a model of the local area and generate content based in part on the updated model.

The processing module 765 executes applications within the AR/VR system 750 and receives position information, acceleration information, velocity information, predicted future positions, or some combination thereof, of the HMD 700 from the tracking module 760. Based on the received information, the processing module 765 determines content to provide to the HMD 700 for presentation to the user. For example, if the received information indicates that the user has looked to the left, the processing module 765 generates content for the HMD 700 that mirrors the user's movement in a virtual environment or in an environment augmenting the local area with additional content. Additionally, the processing module 765 performs an action within an application executing on the console 790 in response to an action request received from the I/O interface 715 and provides feedback to the user that the action was performed. The provided feedback may be visual or audible feedback via the HMD 700 or haptic feedback via the I/O interface 715.

In some embodiments, based on the eye tracking information (e.g., orientation of the user's eyes) received from the eye tracking system 714, the processing module 765 determines resolution of the content provided to the HMD 700 for presentation to the user on the electronic display 725. The processing module 765 may provide the content to the HMD 700 having a maximum pixel resolution on the electronic display 725 in a foveal region of the user's gaze. The processing module 765 may provide a lower pixel resolution in other regions of the electronic display 725, thus lessening power consumption of the AR/VR system 750 and saving computing resources of the console 790 without compromising a visual experience of the user. In some embodiments, the processing module 765 can further use the eye tracking information to adjust where objects are displayed on the electronic display 725 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A beam scanner comprising:
    a first redirecting diffraction grating configured to diffract an impinging first light beam to obtain a second light beam having a first handedness of polarization;
    a polarization volume hologram (PVH) grating disposed and configured to receive and diffract the second light beam by reflective diffraction to obtain a third light beam, wherein a chromatic dispersion of the first redirecting diffraction grating is opposite to a chromatic dispersion of the PVH grating; and a tiltable reflector disposed and configured to receive and reflect the third light beam at a variable angle back towards the PVH grating;

wherein the third light beam reflected by the tiltable reflector has a second handedness of polarization opposite to the first handedness, whereby the third light beam propagates through the PVH grating.

2. The beam scanner of claim 1, wherein the PVH grating comprises a liquid crystal layer comprising liquid crystal molecules in a periodic helical configuration.

3. The beam scanner of claim 2, wherein the liquid crystal molecules have spatially varying azimuthal angle at a surface of the liquid crystal layer.

4. The beam scanner of claim 2, wherein the periodic helical configuration is polymer-stabilized.

5. The beam scanner of claim 2, wherein the liquid crystal molecules comprise nematic liquid crystal molecules in a cholesteric configuration including a plurality of helical periods between top and bottom surfaces of the liquid crystal layer.

6. The beam scanner of claim 1, further comprising a collimator upstream of the first redirecting diffraction grating, wherein the collimator is configured to collimate the first light beam impinging onto the first redirecting diffraction grating.

7. The beam scanner of claim 1, further comprising a second redirecting diffraction grating configured to diffract an impinging fourth light beam to obtain a fifth light beam having the first handedness of polarization;

wherein the PVH grating is disposed and configured to receive and diffract the fifth light beam by reflective diffraction to obtain a sixth light beam, wherein a chromatic dispersion of the second redirecting diffraction grating is opposite to the chromatic dispersion of the PVH grating;

wherein the tiltable reflector is configured to receive and reflect the sixth light beam at a variable angle back towards the PVH grating; and wherein the sixth light beam reflected by the tiltable reflector has the second handedness of polarization opposite to the first handedness, whereby the sixth light beam propagates through the PVH grating.

8. The beam scanner of claim 7, wherein the first and second redirecting diffraction gratings are disposed side-by-side.

9. The beam scanner of claim 1, wherein the tiltable reflector comprises a 2D microelectromechanical system (MEMS) tiltable reflector.

10. A projector comprising:
a first light source for providing a first light beam;
a first redirecting diffraction grating disposed and configured to receive and diffract the first light beam to obtain a second light beam having a first handedness of polarization;
a polarization volume hologram (PVH) grating disposed and configured to receive and diffract the second light beam by reflective diffraction to obtain a third light beam, wherein a chromatic dispersion of the first redirecting diffraction grating is opposite to a chromatic dispersion of the PVH grating; and
a tiltable reflector disposed and configured to receive and reflect the third light beam at a variable angle back towards the PVH grating;
wherein the third light beam reflected by the tiltable reflector has a second handedness of polarization opposite to the first handedness, whereby the third light beam propagates through the PVH grating.

11. The projector of claim 10, wherein the PVH grating comprises a liquid crystal layer comprising liquid crystal molecules in a periodic helical configuration.

12. The projector of claim 11, wherein the liquid crystal molecules have spatially varying azimuthal angle at a surface of the liquid crystal layer.

13. The projector of claim 11, further comprising a collimator in an optical path between the first light source and the first redirecting diffraction grating, wherein the collimator is configured to collimate the first light beam impinging onto the first redirecting diffraction grating.

14. The projector of claim 13, wherein the first light source comprises a plurality of individually controllable emitters optically coupled to the collimator for providing a plurality of collimated sub-beams, wherein the first light beam impinging onto the first redirecting diffraction grating comprises the plurality of collimated sub-beams.

15. The projector of claim 14, wherein the plurality of individually controllable emitters comprises an emitter of a red color channel, an emitter of a green color channel, and an emitter of a blue color channel of an image to be displayed by the projector.

16. The projector of claim 10, further comprising:
a second light source for providing a fourth light beam; and
a second redirecting diffraction grating configured to diffract an impinging fourth light beam to obtain a fifth light beam having the first handedness of polarization;
wherein the PVH grating is disposed and configured to receive and diffract the fifth light beam by reflective diffraction to obtain a sixth light beam, wherein a chromatic dispersion of the second redirecting diffraction grating is opposite to the chromatic dispersion of the PVH grating;
wherein the tiltable reflector is configured to receive and reflect the sixth light beam at a variable angle back towards the PVH grating; and
wherein the sixth light beam reflected by the tiltable reflector has the second handedness of polarization opposite to the first handedness, whereby the sixth light beam propagates through the PVH grating.

17. A near-eye display comprising:
a first light source for providing a first light beam;
a first redirecting diffraction grating disposed and configured to receive and diffract the first light beam to obtain a second light beam having a first handedness of polarization;
a polarization volume hologram (PVH) grating disposed and configured to receive and diffract the second light beam by reflective diffraction to obtain a third light beam, wherein a chromatic dispersion of the first redirecting diffraction grating is opposite to a chromatic dispersion of the PVH grating;
a tiltable reflector disposed and configured to receive and reflect the third light beam at a variable angle back towards the PVH grating, wherein the third light beam reflected by the tiltable reflector has a second handedness of polarization opposite to the first handedness, whereby the third light beam propagates through the PVH grating; and
a controller operably coupled to the first light source and the tiltable reflector and configured to:
operate the tiltable reflector to cause the third light beam reflected from the tiltable reflector and propagated through the PVH grating to have a beam angle corresponding to a first pixel of an image to be displayed; and operate the first light source in coordination with operating the tiltable reflector, such that the third light beam has brightness corresponding to the first pixel.

18. The near-eye display of claim 17, further comprising a pupil-replicating waveguide disposed proximate the PVH grating and configured to receive and propagate therein the third light beam propagated through the PVH grating.

19. The near-eye display of claim 17, further comprising a collimator in an optical path between the first light source and the first redirecting diffraction grating, wherein the collimator is configured to collimate the first light beam impinging onto the first redirecting diffraction grating;

wherein the first light source comprises a plurality of emitters optically coupled to the collimator for providing a plurality of collimated sub-beams each corresponding to a color channel of the image to be displayed, wherein the first light beam impinging onto the first redirecting diffraction grating comprises the plurality of collimated sub-beams; and wherein the controller is operably coupled to the plurality of emitters and is configured to operate the plurality of emitters in coordination with operating the tiltable reflector, such that the third light beam has color corresponding to the first pixel.

20. The near-eye display of claim 17, further comprising:
a second light source for providing a fourth light beam; and
a second redirecting diffraction grating configured to diffract an impinging fourth light beam to obtain a fifth light beam having the first handedness of polarization;

wherein the PVH grating is disposed and configured to receive and diffract the fifth light beam by reflective diffraction to obtain a sixth light beam, wherein a chromatic dispersion of the second redirecting diffraction grating is opposite to the chromatic dispersion of the PVH grating;

wherein the tiltable reflector is configured to receive and reflect the sixth light beam at a variable angle back towards the PVH grating;

wherein the sixth light beam reflected by the tiltable reflector has the second handedness of polarization opposite to the first handedness, whereby the sixth light beam propagates through the PVH grating; and wherein the controller is operably coupled to the second light source and configured to:
operate the tiltable reflector to cause the sixth light beam reflected from the tiltable reflector and propagated through the PVH grating to have a beam angle corresponding to a second pixel of the image to be displayed; and operate the second light source in coordination with operating the tiltable reflector, such that the sixth light beam has brightness corresponding to the second pixel.

* * * * *